United States Patent
Abbattista

(10) Patent No.: US 10,154,570 B2
(45) Date of Patent: Dec. 11, 2018

(54) OUTDOOR LIGHTING APPARATUS WITH SHORT RANGE OF VERY SHORT RANGE COMMUNICATION INTERFACE

(71) Applicant: ENEL SOLE S.R.L., Rome (IT)

(72) Inventor: Mauro Abbattista, Rome (IT)

(73) Assignee: ENEL SOLE S.R.L., Rome (IT)

( * ) Notice: Subject to any disclaimer, the term of this patent is extended or adjusted under 35 U.S.C. 154(b) by 0 days.

(21) Appl. No.: 15/328,967

(22) PCT Filed: Jul. 30, 2015

(86) PCT No.: PCT/IB2015/055771
§ 371 (c)(1),
(2) Date: Jan. 25, 2017

(87) PCT Pub. No.: WO2016/016838
PCT Pub. Date: Feb. 4, 2016

(65) Prior Publication Data
US 2017/0215256 A1    Jul. 27, 2017

(30) Foreign Application Priority Data
Jul. 31, 2014    (IT) .............................. RM2014A0438

(51) Int. Cl.
H05B 37/02    (2006.01)
H05B 37/03    (2006.01)
(Continued)

(52) U.S. Cl.
CPC ....... *H05B 37/0263* (2013.01); *H04B 5/0062* (2013.01); *H05B 33/0845* (2013.01);
(Continued)

(58) Field of Classification Search
None
See application file for complete search history.

(56) References Cited

U.S. PATENT DOCUMENTS

2007/0109142 A1    5/2007    McCollough, Jr.
2014/0028200 A1*   1/2014    Van Wagoner .... H05B 37/0272
                                                315/158

FOREIGN PATENT DOCUMENTS

GB    2403357 A    12/2004
WO    2014009880 A2    1/2014

OTHER PUBLICATIONS

International Search Report for PCT/IB2015/055771 dated Nov. 5, 2015.
Italian Search Report for IT RM2014A000438 dated Oct. 23, 2014.

* cited by examiner

*Primary Examiner* — Jany Richardson
(74) *Attorney, Agent, or Firm* — Thomas Horstemeyer, LLP

(57) ABSTRACT

An outdoor lighting apparatus (1) for fixed installation is described, suitable to be connected to an electric mains to be supplied with mains supply voltage. The lighting apparatus (1) comprises at least one light source (6), a driving circuit (30) of the at least one light source (6). The outdoor lighting apparatus further comprises a control and communication circuit (20), suitable to control the driving circuit (30), comprising a processing and control unit (21), a memory unit (25), and a long-range communication interface (23) suitable to allow the control and communication circuit (20) communicating with a remote control device (60). The outdoor lighting apparatus is further equipped with a short range or very short range communication interface (24) suitable to interface with a communication and/or configuration mobile terminal to allow said mobile terminal accessing the memory unit (25) in writing and/or reading. The short or very short range communication interface (24) facilitates the configuration, maintenance and/or replacement of the electric apparatus (1).

22 Claims, 2 Drawing Sheets

(51) Int. Cl.
  *H04B 5/00*      (2006.01)
  *H05B 33/08*     (2006.01)
  *H05B 41/38*     (2006.01)
  *F21Y 115/10*    (2016.01)
  *F21V 15/01*     (2006.01)
  *F21V 31/00*     (2006.01)
  *F21W 131/103*   (2006.01)

(52) U.S. Cl.
  CPC ....... H05B 37/0272 (2013.01); H05B 37/034 (2013.01); H05B 41/38 (2013.01); *F21V 15/01* (2013.01); *F21V 31/00* (2013.01); *F21W 2131/103* (2013.01); *F21Y 2115/10* (2016.08); *Y02D 70/00* (2018.01); *Y02D 70/142* (2018.01); *Y02D 70/164* (2018.01); *Y02D 70/166* (2018.01); *Y02D 70/42* (2018.01)

OUTDOOR LIGHTING APPARATUS WITH SHORT RANGE OF VERY SHORT RANGE COMMUNICATION INTERFACE

CROSS-REFERENCE TO RELATED APPLICATION

This application is the 35 U.S.C. § 371 national stage application of PCT Application No. PCT/IB2015/055771, filed Jul. 30, 2015, where the PCT claims priority to and the benefit of, IT Patent Application No. RM2014A000438, filed Jul. 31, 2014, both of which are herein incorporated by reference in their entireties.

The present description relates to the technical field of lighting apparatuses, particularly for road or urban lighting, and more particularly relates to an outdoor lighting apparatus for fixed installation with short or very short range communication interface.

As is known, outdoor lighting systems, such as for example road or urban lighting systems, both public and private, such as, for example, industrial plants and shopping centres, often comprise a large number of lighting apparatuses that are distributed in the area.

In order to properly configure each lighting apparatus during installation, implement advanced solutions for the remote management of outdoor lighting systems and properly manage the maintenance and/or replacement of the lighting apparatuses, it is required to properly record one or more datums or parameters related to the lighting apparatus such as: at least an identifier of the lighting apparatus 1, and/or a network address, serial number, installation location, type of lighting apparatus, operating parameter of the electric apparatus 1 and/or management data (such as installation date, a datum identifying the field operator who performed the installation and/or the date of last maintenance, etc.).

Currently, attempts are being made to meet these needs, for example, by applying adhesive labels bearing identification barcodes (representing for example a serial number, a network address, etc.) to the lighting apparatuses and recording additional information to be associated to the identification codes by manual transcription in paper registers and/or through entry into a management software application.

It is intuitively obvious that the field operators may easily make transcription/typing errors. Furthermore, it is intuitively obvious how the above expedients of the known art can present problems in the case where there is an unwanted or voluntary detachment of the barcode label and/or in the case where it is discoloured, scratched or oxidised, etc., and it is no longer possible to read the barcode and/or when the operator simply makes an error when merely transcribing the codes from the paper registers to the management software.

An object of the present description is to provide an outdoor lighting apparatus for fixed installation that allows overcoming the problems described above with reference to the outdoor lighting systems of the prior art.

These and other purposes are achieved through an outdoor lighting apparatus for fixed installation as defined in claim 1 in its most general form, and in the dependent claims in several particular embodiments.

The invention will be better understood from the following detailed description of its embodiments, provided by way of example and therefore in no way limiting, in relation to the accompanying drawings, wherein:

In the accompanying figures, equal or similar elements will be indicated by the same reference numbers.

FIG. 1 shows an outdoor lighting apparatus for fixed installation that is globally indicated with the reference number 1 and that in the rest of this description will be also referred to as the lighting apparatus 1.

Figure 1:
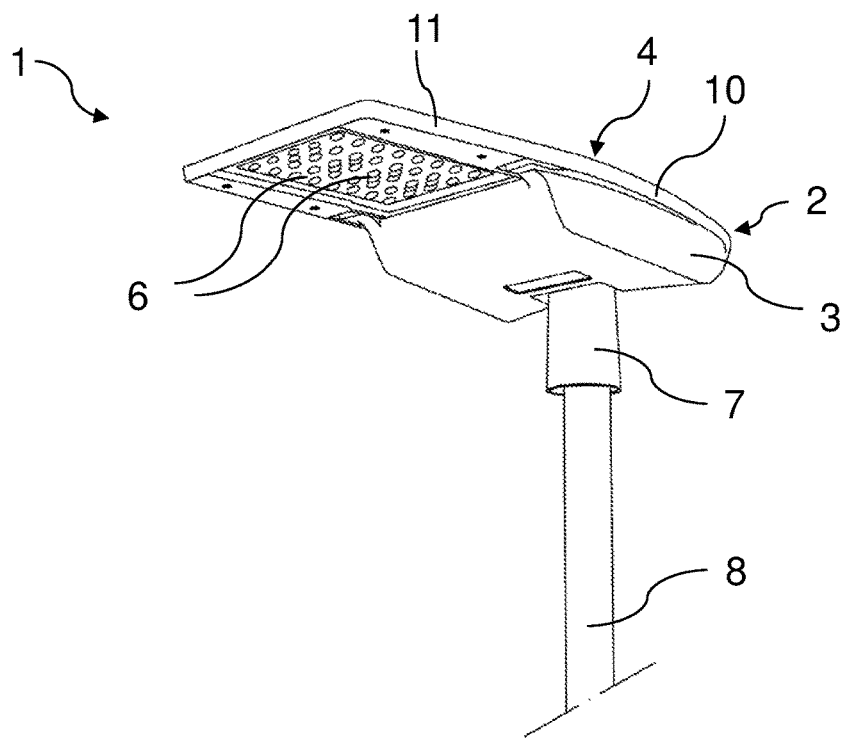
FIG. 1 shows a perspective view from below of an outdoor lighting apparatus represented in a first configuration and comprising a support pole, this pole being partially represented in FIG. 1.

According to a preferred embodiment, the apparatus 1 is an outdoor lighting apparatus of a public lighting system, for example installed in order to illuminate a road or a site of particular artistic and monumental value, or an outdoor lighting apparatus belonging to a private system, for example for illuminating the outdoor area of a parking lot or a shopping centre.

The lighting apparatus 1 comprises a chassis 2. The chassis 2 preferably but not limitatively comprises a base 3, a cover 4, and preferably one or more hinge elements 5 adapted to connect the base 3 and cover 4 to each other. Preferably, the base 3 has a generally box-shaped conformation, such as for example a generally tray-shaped conformation, for example a generally quadrangular tray-shaped conformation. Preferably, the cover 4 has a substantially plate-shaped or half-shell conformation. According to a preferred embodiment, the base 3 and the cover 4 they are made of metal and more preferably aluminium alloy or plastic.

According to an embodiment, the lighting apparatus 1 further comprises one or more reversible coupling elements 7, such as for example a coupling member 7 fixed to the chassis 2, provided for removably fixing the lighting apparatus 1 for example to a support pole 8 or to a support wall, to allow a fixed installation during normal operation of the apparatus 1 but, in any case, providing the possibility of removal, for example for extraordinary maintenance or replacement.

Figure 2:
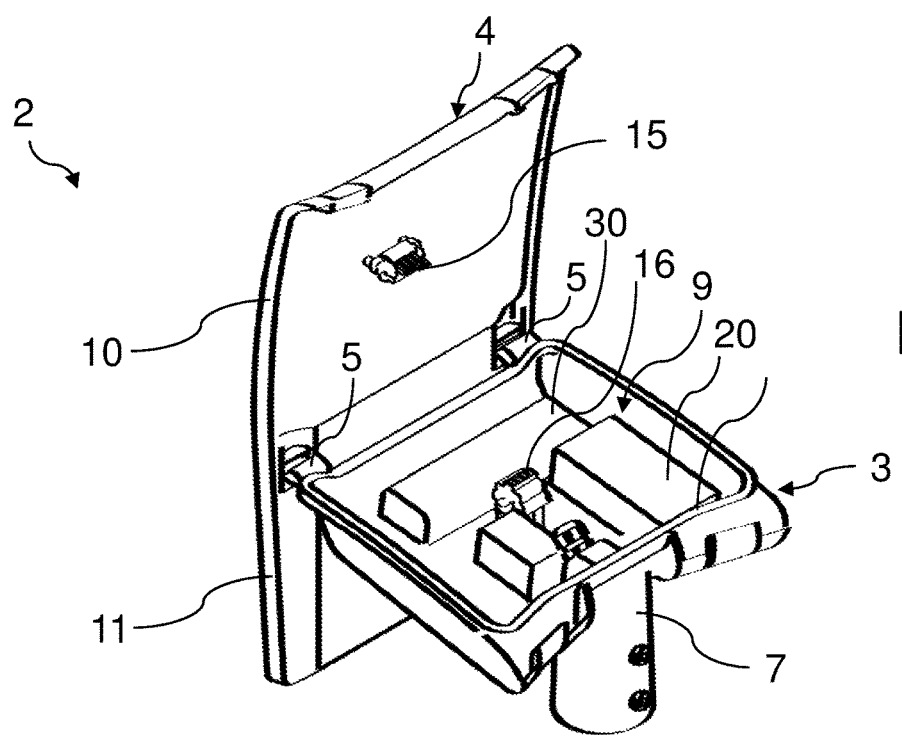
FIG. 2 shows a perspective view from above of the lighting apparatus of FIG. 1 represented in a second configuration and without the support pole, wherein this lighting apparatus is represented in a slightly more schematic way with respect to FIG. 1 so that some details represented in FIG. 1 are not represented in FIG. 2 or are represented in a more schematic way.

With reference to FIG. 2, the base 3 of the chassis 2 comprises a housing compartment 9. The cover 4 preferably and not limitatively comprises a cover part 10 and an optical part 11. The cover part 10 closes the housing compartment 9 when the cover 4 assumes a respective closed configuration. Conversely, when the cover 4 assumes a respective open configuration, the cover part 10 is disposed so as to expose the housing compartment 9 to allow access to such housing compartment 9. The above-mentioned closed configuration of the cover 4, in which the cover 4 preferably assumes a horizontal or substantially horizontal disposition, is shown in FIG. 1. In this regard, note that, due to the fact that the lighting apparatus 1 is generally exposed to the weather, in the example in the closed configuration of the cover 4 the housing compartment 9 is watertight so as to protect its contents. The above-mentioned open configuration of the cover 4, in which the cover 4 preferably assumes a vertical or substantially vertical disposition, is shown in FIG. 2.

Returning to FIG. 1, to the optical part 11, which is preferably an extension of the cover part 10, is associated at least one light source 6 and preferably respective reflection and/or refraction elements. According to a preferred and not limiting embodiment, the cover 4 comprises a plurality of LEDs (Light Emitting Diodes) 6. In general, the optical part 11 comprises the optics of the lighting apparatus 1. According to a preferred embodiment, this optical part comprises an LED module or LED board comprising a plurality of LEDs 6 and reflection and/or refraction elements such as a lens and a protective shield formed preferably by a glass plate. Note, in any case, that a lighting apparatus 1 according to the teachings of this description may comprise in general one or more light sources 6, which may be of substantially point-shaped light sources, such as the LEDs 6, but also a any other type of light sources, such as HPS (High Pressure Sodium) sources or metal halide sources, suitable for use in an outdoor lighting apparatus, for example road or urban, including therefore sources such as discharge lamps or the metal halide lamps.

With reference to FIG. 2, the lighting apparatus 1 comprises a control and communication circuit and a driving circuit 30 of the light source 6. According to an embodiment the control and communication circuit 20 and the driving circuit 30 are two physically distinct circuit modules, each made for example on its own printed circuit board, which are interconnected to each other and each of which is provided with a own container. In an alternative embodiment, the control and communication circuit 20 and the driving circuit 30 are two logically distinct circuit sections of the same circuit module.

The control and communication circuit 20 and the driving circuit 30 are preferably housed in the chassis 2, however, any one, or both, of them may be outside the chassis 2, for example housed in one or more containers fixed to the pole 8, for example inside it, at a distance from the ground or in a dedicated electric panel at the base of pole 8.

The control and communication circuit 20 is adapted to control the driving circuit 30 and is preferably adapted to selectively activate and deactivate the driving circuit 30. Preferably, the control and communication circuit 20 is also adapted to control the driving circuit 30 to adjust, in the state of activation of the latter, the electrical power to be supplied to the light source 6 and thus to adjust the light power emitted by the light source 6. In other words, the control and communication circuit 20 allows dimmering the light source 6. In addition, according to an embodiment, the control and communication circuit 20 preferably allows detecting the operating status of the light source 6 and, in particular, reporting its sudden, unexpected switching off or flickering, in the case of discharge lamps, or exhaustion and end of life of the light source 6. Preferably, the control and communication circuit 20 also allows measuring the main electrical parameters of the light source 6, in particular the power supply voltage and current values, power factor and energy consumed, day by day.

Figure 3:
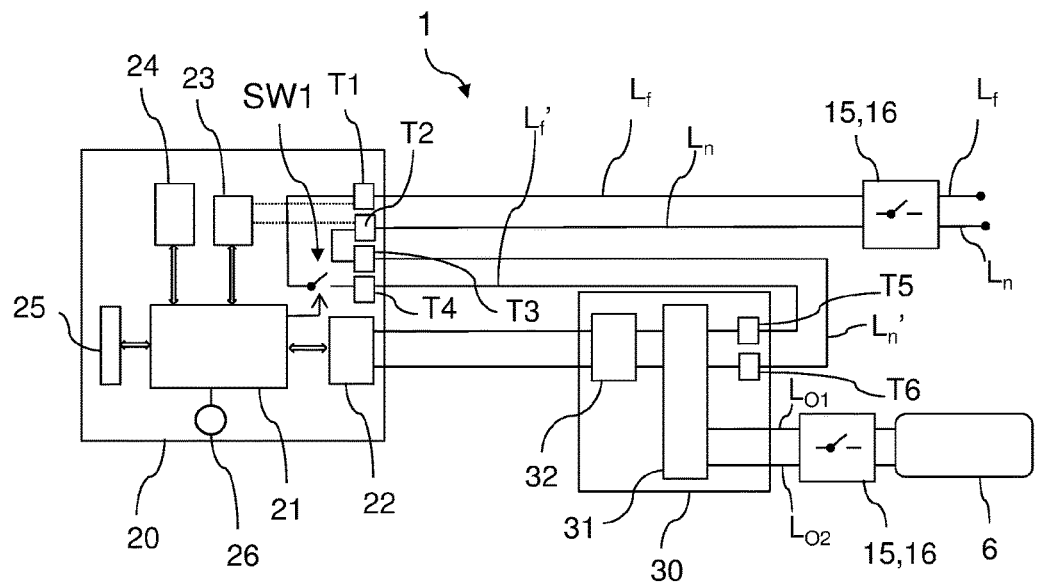
FIG. 3 shows a block circuit diagram of the lighting apparatus of FIG. 1.
Figure 4:
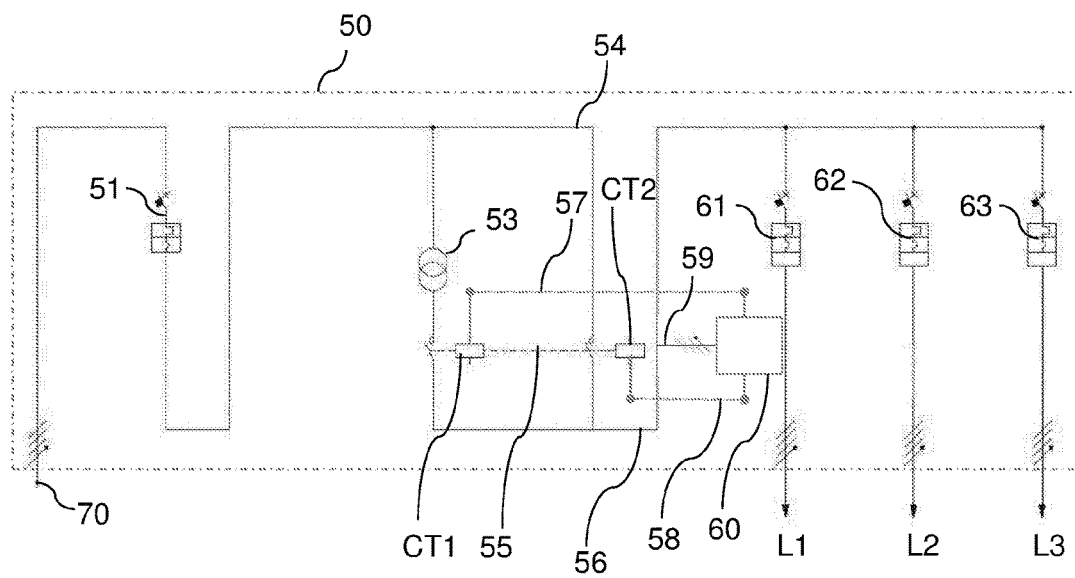
FIG. 4 shows a block circuit diagram of an electric power supply panel external to the lighting apparatus of FIG. 1 and connectable to said apparatus.

With reference to FIGS. 3 and 4, the lighting device 1 comprises an electric power supply line $L_F$, $L_N$ and the control and communication circuit 20 is preferably such as to receive in input the electric power supply line $L_F$, $L_N$ to be connected to an alternating current electric mains by means of a remote electric power supply panel 50. The remote electric power supply panel 50 is preferably remotely connected to a plurality of lighting apparatuses 1, for example connected to a number of lighting apparatuses 1 of the order of tens or hundreds.

In the particular non-limiting example represented in FIG. 3, the electric power supply line includes two conductors $L_F$, $L_N$ and in particular a phase conductor $L_F$ and a neutral conductor $L_N$.

In the example of FIG. 3 the driving circuit 30 is connected to the light source 6 by means of a power line $L_{O1}$, $L_{O2}$, in the example comprising two conductors.

Referring now jointly to FIGS. 2 and 3, according to a possible embodiment, the lighting apparatus 1 comprises at least a disconnection device 15, 16 adapted to open and close the power line $L_F$, $L_N$ based on the position of the cover 4 in order to disconnect/connect the control and communication circuit 20 from/to the alternating current electric mains. This advantageously allows determining the opening or closing of the power line $L_F$, $L_N$ without the need to use tools and ensuring maintenance in total electrical safety, with the unit switched off.

According to a preferred embodiment, the disconnection device 15, 16 is a multipolar device (in the example four-pole) and is adapted to both to disconnect the power supply line $L_F$, $L_N$ and the interconnection the line $L_{O1}$, $L_{O2}$ between the driving circuit 30 and the light source 6.

With reference to FIG. 2, the disconnection device 15, 16 is preferably a sectioning device comprising a male connector 15 provided on the cover 4 and a female connector 16 provided in the base 3.

The control and communication circuit 20 comprises a processing unit 21 and at least one memory unit 25.

The control and communication circuit 20 is adapted to control the driving circuit 30, and adapted to communicate, preferably bi-directionally, with a remote control device 60, for example, with a data concentrator of a powerline communication system. With reference to FIG. 4, in the example represented in it, the above-mentioned remote control device 60 is housed inside the electric power supply panel 50, preferably connected to a plurality of lighting apparatuses 1, and allows remotely controlling a number of lighting apparatuses 1 order of tens or hundreds. In an alternative embodiment, the remote control device 60 may be arranged outside the electric power supply panel 50. Moreover, it is not necessary that the remote control device 60 is a powerline device since it could for example be a wireless device, for example provided with WI-FI interface or, for communication with the lighting apparatuses 1, it could include either a powerline or a wireless interface.

The above-mentioned remote control device 60 may possibly be connected to a remote control centre dapted to control a plurality of remote control devices 60.

The lighting apparatus 1 is preferably adapted to be selectively powered by the electric mains and, in the example represented by power supply panel 50, with a first power supply voltage value or with a second power supply voltage value lower than the first power supply voltage value.

The control and communication circuit 20 is preferably configured to work with both of the above voltage values. When the electrical apparatus 1 is supplied the first voltage value, the control and communication circuit 20 is adapted and configured to keep the supply of the driving circuit 30 enabled while, when the electric apparatus 1 is supplied with the second voltage value, the control and communication circuit 20 is adapted and configured to keep the supply of the driving circuit 30 disabled.

According to a preferred embodiment, the lighting apparatus 1 comprises an electronically controllable switch SW1 controllable by the control and communication circuit 20, for example by the processing and control unit 21. Such electronic control switch SW1 is adapted to selectively assume a state of opening or closing for disconnecting/powering the driving circuit 30 and bringing the light source 6 respectively to a switched-off or switched-on state. In this embodiment:

when the electrical apparatus 1 receives the first voltage value, the control and communication circuit 20 is adapted and configured to keep the electronic control switch SW1 in the closed state to power the driving circuit 30; while when the electrical apparatus 1 receives the second voltage value, the control and communication circuit 20 is adapted and configured to keep the electronic control switch SW1 in the open state to disconnect the driving circuit 30.

Preferably, the above-mentioned electronic control switch SW1 is a solid state relay.

According to an embodiment, starting from a condition in which the above-mentioned switch SW1 is closed, the driving circuit 30 is supplied and the mains voltage has said first value, the control and communication circuit 20 is configured to receive from the remote control device 60 a turn-off signal (for example, a turn-off message) and in response to such a signal, is such as to command the opening of the switch SW1. Preferably, after such opening, the power supply panel 50 will vary the mains voltage so that this assumes the above-mentioned second value.

When the mains voltage assumes the above-mentioned second value, the control and communication circuit 20, after switching off the driving circuit 30, will continue to operate even during the daytime hours, for example not only to ensure in case of failure of a module immediate reporting to the control centre (without waiting for the turning-on of the lighting system in the evening hours), but also to allow the continuity of other functions that will be described below.

Similarly, starting from a condition in which the above-mentioned switch SW1 is open, the driving circuit 30 is not supplied and said mains voltage has said second value, the control and communication circuit 20 is configured to receive from the remote control device 60 a turn-on signal (for example, a turn-on message) and in response to such a signal, is such as to command the closing of the switch SW1. Preferably, said closure of the switch SW1 is commanded after the power supply panel 50 will have varied the power supply voltage so that it assumes the first value.

According to a particularly advantageous embodiment, the first voltage value is a low voltage value and the second voltage value is a safety extra-low voltage value (SELV). In this way it is, for example, possible to power electrical apparatus 1 with a safety voltage in the daytime, in this way reducing the electric risk. For example, in the case where the power supply voltage is an alternating voltage, the first voltage value is greater than, or equal to, 120 VAC and for example equal to 230 VAC and the second voltage value is less than or equal to 50 VAC and for example equal to 48 VAC.

In the non-limiting embodiment represented in FIG. 3, the power supply line $L_n$, $L_f$ connectable to the electric mains is connected in input to the control and communication circuit 20 and the above-mentioned electronic switch SW1 comprises a relay adapted to connect the driving circuit 30 to supply line $L_n$, $L_f$ in parallel to the control and communication circuit 20 or to disconnect it from said power supply line $L_n$, $L_f$.

In the particular example represented, the conductors of the power line $L_n$, $L_f$ are connected to two terminals T1 and T2 of the control and communication circuit 20 and power it, for example being provided a voltage conditioning circuit (not shown in the figures) such as, for example, a voltage regulator and/or a rectifier, a filter, etc. The control and communication circuit 20 comprises a further terminal T4 to which it is connected to another conductor $L_f'$ that it is also connected to a terminal T5 of the driving circuit 30. The switch SW1 allows selectively short-circuiting the terminals T1 and T4 or disconnecting them from each other and thus allows connecting/disconnecting the conductor $L_f$ to/from the conductor $L_f'$ and, therefore, providing, or not providing, power to the terminal T4. To terminal T3 of the control and communication circuit 20 is connected another conductor $L_f'$ that it is also connected to a terminal T6 of the driving circuit 30. Clearly, the detailed embodiment described above is not limiting and only provided by way of example.

Even the driving circuit 30 may be equipped with a conditioning circuit of the power supply voltage. The driving circuit 30 can be, or comprise, for example, a driver of an array of LEDs or a ballast for a lamp and includes a power section 31 connected to the light source 6 and a local data interface section 32 operatively connected or connectable to a corresponding local data interface section 22 provided in the control and communication circuit 20. The above-mentioned local data interface sections are, for example, bi-directional Digital Addressable Lighting Interface (DALI) interfaces or mono-directional 1-10V interfaces, and allow the control and communication circuit 20 and the driving circuit 30 to communicate with each other. For example, by means of these interfaces 22, 32, the control and communication circuit 20 can modulate the light power emitted by the light source 6 (dimmering) and/or can monitor the operating status (correct operation, consumption and/or temperature, etc.) of the driving device 30 and possibly also of the light source 6. Preferably, if unidirectional 1-10V local data interfaces 22, 32 are used (in this case the control and communication circuit 20 controls the driving circuit 30 but cannot receive information from it) or if the driving circuit 30 does not allow sending information back to the control and communication circuit 20, the monitoring of the operating status of the lighting apparatus 1 and the measurement of the main electrical parameters may, in any case, take place through suitable sensors that measure these values on the power supply interface SW1, T3, T4 of the driving circuit 30.

According to an advantageous embodiment, the control and communication circuit 20 comprises a long range powerline communication interface 23 for communicating on the electric mains with the remote control device 60. For example, the above-mentioned interface 23 is operatively connected to the processing and control unit 21. In addition or alternatively, the control and communication circuit 20 comprises a long range wireless communication interface for communicating with the remote control device 60. For the purposes of this description, long range communication interface means an interface, wired or wireless, that allows communication between two or more entities at a distance of at least 50 meters.

The control and communication circuit 20 comprises a short range or very short range communication interface 24 adapted to interface with a communication and/or configuration mobile terminal of a field operator to allow the said mobile terminal accessing the memory unit in writing and/or reading.

For example, the above-mentioned mobile communication and/or configuration terminal is a smartphone or a tablet PC.

For the purposes of this description, short or very short range communication interface means a communication interface that allows communication at a maximum distance of one meter, preferably less than 30 centimeters and more preferably less than 10 centimeters. For example, the above-mentioned short or very short range communication interface 24 is, or includes, a wireless RF-ID interface or a wireless NFC (Near Field Communication) interface or a wireless TransferJet interface. Preferably, the above-mentioned communication interface 24 is such that it can perform both read operations and write operations from/to the memory 25. According to an embodiment, in the case where the short or very short range communication interface 24 is or includes an RF-ID tag, the above-mentioned memory unit 25 is comprised in said RF-ID tag.

According to an embodiment, the short range or very short range communication interface 24 is adapted to allow a field operator to store, during the installation step of the lighting apparatus 1, a datum or a parameter identifying the installation position of the lighting apparatus 1 in the memory unit 25. Preferably, said datum or parameter identifying the installation position of the lighting apparatus 1 comprises the coordinates in a satellite geo-localisation system and/or the installation address (for example, the name of the street and, possibly, the house number) and/or a number that allows identifying the relative installation position of the lighting apparatus 1 in an array of lighting apparatuses.

According to an embodiment, in the memory unit there is stored, in a permanent and preferably non-rewritable manner during normal operation of the lighting apparatus 1, more preferably already in the production phase of the lighting apparatus 1, a datum identifying the apparatus 1 such as, for example, a serial number and/or a network address and/or datum identifying the type of the lighting apparatus 1.

According to an embodiment, in the memory unit 25 is stored permanently, but preferably in a rewritable manner during normal operation of the lighting apparatus 1, at least one configuration and/or operating parameter of said apparatus 1.

The use of the said short range or very short range communication interface, for example of the RFID type, allows considerably simplifying the initial configuration operations of the control and communication circuit 20 installed in the lighting apparatus 1, so that it recognised by the entire network. On the contrary, in the state of the prior art, to make the network function and identify a lighting apparatus 1 among several others, it is necessary to associate an identification code of the control and communication circuit 20, for example a MAC address and/or a serial number, to the ID code assigned by the maintenance operator to the individual support or lighting apparatus 1, for example on the chassis 2. Usually this association is made manually, by reporting on a cardboard or paper sheet, next to the ID code of the support or the lighting apparatus luminaire 1, the identifying barcode of the MAC address or serial number of the control and communication circuit 20. These two pieces of information must subsequently be entered in the remote control software, by manually typing both codes, possibly with the aid of a barcode reader, with a high probability of making errors of association. The consequence is that of detecting, after the entry of the data, a possible number of non-functioning lighting apparatuses 1 for which reason it will be necessary to return to the field to re-check the association of the two codes. Instead, the use of RFID technology or, in general, of a short or very short range, preferably wireless, communication interface, combined with the use of an operator terminal such as a handheld smartphone, equipped with a suitable application, will allow overcoming these difficulties of configuring the systems of the prior art since, in the installation step of the lighting apparatus 1, it is sufficient to bring the mobile terminal to the control and communication circuit 20, so that for example the association between the identification code stored in the control and communication circuit 20 and the identification code of the support or the lighting apparatus 1 (typed directly on the smartphone or tablet) occurs automatically, without the possibility of error.

The use of the above-mentioned short or very short range communication interface 24 is also very useful in case of maintenance and replacement of damaged control and communication circuits 20. With current control systems, in case of maintenance and replacement, it is necessary to repeat the procedure of associating the codes previously described. While with the above-mentioned short or very short range communication interface 24, the substitution of a control and communication circuit 20 is much simpler. It is sufficient to replace the damaged control and communication circuit 20 with a new, functioning one and, using the smartphone or tablet, which will retrieve all identifying data and codes, through a direct connection to the control software for example on a mobile cellular network, and download the information, in real time and automatically, in the new control and communication circuit 20 installed. The system will update all the information in real time without the possibility of error.

According to a possible embodiment, the control and communication circuit 20 also comprises a sensor 26 adapted to measure a quantity related to the inclination of the lighting apparatus 1. This sensor 26 is operatively connected to the processing unit 21 and it allows the control and communication device 20 to send to the remote control device 60 a datum relative to the inclination, or an inclination change, of the lighting apparatus 1. For example, the above-mentioned sensor is an acceleration sensor, for example a MEMS accelerometer, preferably an inertial MEMS accelerometer, for example triaxial.

The measurements provided by the sensor 26, i.e., of the above-mentioned quantity related to the inclination of the lighting apparatus 1, can for example be processed locally by the processing unit 21 but, alternatively or in addition, can also be processed by the remote control device 60.

Thanks to the provision of the sensor 26, the control and communication circuit 20 can remotely communicate data related to the inclination of the lighting apparatus 1 to allow detecting an accidental fall of the lighting apparatus 1 or a change of inclination due for example to the action of the weather or environmental conditions, such as, for example, the wind or vegetation, that vary the inclination with respect to the inclination conditions set in the installation step or a change due for example to the support being knocked down by a traffic accident or an inclination due to the subsidence of the foundation block.

Note that, in addition, the information provided by the sensor 26 can be processed by the control and communication circuit 20 and/or by the remote control device 60, possibly together with further data from other sensors (video cameras, acoustic sensors, etc.), to return more complex output, such as, for example, the monitoring of areas subject to landslides (by measuring the variation of inclination day by day of several consecutive lighting apparatuses 1), the installation of unauthorised objects or apparatuses on public lighting supports such as lights, ladders, flower boxes, billboards, etc., which can compromise the static condition of the supports.

According to a particularly advantageous embodiment, the control and communication device 20 is such as to store a datum related to the inclination set during the installation step, for example, acquired via the sensor 26, to estimate variations of inclination (via the sensor 26 and the processing unit 21) and to send to the remote control device 60 alarm messages related to variations of inclination that, exceeding a predetermined threshold, require maintenance of the lighting apparatus and/or the support pole 8. Preferably, the above-mentioned alarm messages comprise a datum or parameter identifying the installation position of the lighting apparatus 1, such as, for example, the coordinates in a satellite geo-localisation system (such as, for example, the GPS coordinates) and/or the installation address (for example, the name of the street and, possibly, the house address) or a number which allows identifying the relative installation position of the lighting apparatus 1 in an array of lighting apparatuses. As already said previously, the above-mentioned datum or parameter can be stored during installation in the RF-ID tag 24, or in general in a memory accessible via the short or very short range communication interface 24, for example in the memory unit 25.

With reference to FIG. 4, we will now describe an advantageous embodiment of a remote electric power supply panel 50 of a lighting apparatus 1. In the following description, reference will be made to the 20 preferred and non-limiting case in which the abovementioned electric power supply panel 50 comprises the remote control device 60 and to the case in which said remote control device 60 communicates with the lighting apparatus 1 with a powerline transmission technology and 25 more preferably through the protocol called "Meters And More".

The remote electric power supply panel 50 comprises a main switch 51 for connecting/disconnecting the panel to/from an input power supply line 70 connected to an electric mains. The above-mentioned electric mains is for example a three-phase, alternating current distribution mains, for example as 230 VAC, three-phase, electric mains. The above-mentioned main switch 51 is preferably a switch with magneto-thermal and/or differential protection system.

The remote electric power supply panel 50 preferably comprises a voltage transformer 53 comprising a primary winding and a secondary winding and adapted to convert an input voltage having said first value to an output voltage having said second value.

In the above embodiment, downstream of the main switch 51 is connected in series to the main switch 51 the above-mentioned primary winding of the voltage transformer 53. Moreover, downstream of the main switch 51 is connected in series to the main switch 51 and in parallel to the voltage transformer 53 an electric bypass line 54 of the voltage transformer 53.

The remote electric power supply 50 comprises an output power supply line 56 and preferably a first CT1 and a second CT2 contactor electronically controlled by the remote control device 60, in the example using the two control lines 57, 58, for:
disconnecting the secondary winding of the voltage transformer 53 from the output power supply line 56 (in the example, contactor CT1 open) and connecting the output supply line 56 to the bypass line 54 (in the example, contactor CT2 closed); or
disconnecting the output power supply line 56 from the bypass line 54 (in the example, contactor CT2 open) and connecting the secondary winding of the voltage transformer 53 to the output supply line 56 (in the example, contactor CT1 closed).

The remote electric power supply panel 50 preferably comprises an electromechanical interlock system 55 adapted to prevent both contactors CT1 and CT2 being simultaneously in the closed state.

According to a possible embodiment, the output power supply line 56 is branched into a plurality of parallel power supply lines L1-L3, each preferably protected by a respective line switch 61-63, for example provided with magneto-thermal and/or differential protection.

Each of the above-mentioned parallel power supply lines L1-L3, powers a respective plurality of lighting apparatuses 1. For example, the input power supply line input $L_f$, $L_n$ of FIG. 3 is connected to the neutral conductor and one of the three phase conductors of line L1, L2 or L3.

As is clearly apparent from the electrical diagram of FIG. 4, a power supply voltage transformer of the type described above advantageously allows powering the output lines L1-L3 with the first voltage value (for example equal to 230 VAC), preferably in the evening or night hours and with the second voltage value (for example 48 VAC), preferably in the daytime hours. The switching between the two voltage values is commanded by the remote control device 60 that, according to the particular embodiment represented, is a conveyed-wave or wireless data concentrator. The above-mentioned data concentrator 60, in the example via the connection line connected to the output power supply line 56, can communicate with the various lighting apparatuses 1 connected to the output lines L1-L3, for example, but not exclusively, to communicate the switching of the power supply voltage from the first to the second value and vice versa and to force the switching on and off of the light sources 6, dimmering, the receipt of information about the state of operation of the lighting apparatuses 1 connected to it, as well as data related to the electrical operating parameters of the light source 6 of each individual apparatus, as previously defined.

It obvious that numerous modifications and/or variations may be made to what is described and illustrated above by way of example.

Based on what is described above, it is therefore possible to understand how the lighting apparatus 1 allows achieving the purposes mentioned above with reference to the state of the prior art.

Without prejudice to the principle of the invention, the forms of embodiment and details of construction may be varied widely with respect to what has been described and illustrated purely by way of non-limiting example, without thereby departing from the invention as defined in the appended claims.

The invention claimed is:

1. An outdoor lighting apparatus for fixed installation adapted to be connected to a power grid to be supplied with a grid supply voltage, the outdoor lighting apparatus comprising:
  at least one light source;
  a driving circuit of the at least one light source;
  a control and communication circuit, adapted to control the driving circuit, comprising a processing and control unit, a memory unit, and a long-range communication interface adapted to allow the control and communication circuit communicating with a remote control device;
  wherein the control and communication circuit further comprises a short range or very short range communication interface adapted to interface with a communication and/or configuration mobile terminal of a field operator to allow said mobile terminal accessing the memory unit in writing, reading, or both, wherein said short range or very short range communication interface allows communication at a maximum communication distance of one meter or less.

2. The outdoor lighting apparatus for fixed installation according to claim 1, wherein the short range or very short range communication interface comprises an RF-ID tag.

3. The outdoor lighting apparatus for fixed installation according to claim 2, wherein the memory unit is comprised in said RF-ID tag.

4. The outdoor lighting apparatus for fixed installation according to claim 1, wherein the short range or very short range communication interface is adapted to allow an operator storing in the memory unit, during an installation step, a datum or a parameter identifying an installation position of the outdoor lighting apparatus.

5. The outdoor lighting apparatus for fixed installation according to claim 4, wherein said datum or parameter identifying the installation position of the outdoor lighting apparatus comprises coordinates in a satellite geo-localization system, an installation address, a number which allows identifying the relative installation position of the outdoor lighting apparatus in an array of lighting apparatuses, or combination thereof.

6. The outdoor lighting apparatus for fixed installation according to claim 1, wherein a datum identifying the outdoor lighting apparatus comprising a serial number, a network address, or both, is permanently stored in the memory unit.

7. The outdoor lighting apparatus for fixed installation according to claim 1, wherein a datum identifying a type of the outdoor lighting apparatus is permanently stored in the memory unit.

8. The outdoor lighting apparatus for fixed installation according to claim 1, wherein at least one of a configuration parameter and an operation parameter of the outdoor lighting apparatus is permanently stored in the memory unit.

9. The outdoor lighting apparatus for fixed installation according to claim 1, further comprising a sensor adapted to measure a magnitude related to an inclination of the outdoor lighting apparatus, said sensor being operatively connected to the processing and control unit and allowing the control and communication device to send to the remote control device a datum relative to the inclination, or an inclination change, of the outdoor lighting apparatus.

10. The outdoor lighting apparatus for fixed installation according to claim 1, wherein said outdoor lighting apparatus is a LED street lighting apparatus or a discharge lighting apparatus provided with a SAP or metal halide lamp.

11. The outdoor lighting apparatus for fixed installation according to claim 1, wherein said maximum communication distance is less than 30 centimeters.

12. An outdoor lighting apparatus for fixed installation adapted to be connected to a power grid to be supplied with a grid supply voltage, the outdoor lighting apparatus comprising:
   at least one light source;
   a driving circuit of the at least one light source;
   a control and communication circuit, adapted to control the driving circuit, comprising a processing and control unit, a memory unit, and a long-range communication interface adapted to allow the control and communication circuit communicating with a remote control device;
   wherein the control and communication circuit further comprises a short range or very short range communication interface adapted to interface with a communication and/or configuration mobile terminal of a field operator to allow said mobile terminal accessing the memory unit in writing, reading, or both;
   wherein the outdoor lighting apparatus is suitable to be selectively supplied by the power grid with a first supply voltage value and with a second supply voltage value less than the first supply voltage value;
   the control and communication circuit is adapted and configured to operate with both said voltage values in order to communicate with the remote control device, and wherein, when the outdoor lighting apparatus is supplied with the first supply voltage value, the control and communication circuit is such as to keep the supply of the driving circuit enabled, and, when the outdoor lighting apparatus is supplied with the second supply voltage value, the control and communication circuit is such as to keep the supply of the driving circuit disabled.

13. The outdoor lighting apparatus for fixed installation according to claim 12, wherein the short range or very short range communication interface comprises an RF-ID tag.

14. The outdoor lighting apparatus for fixed installation according to claim 13, wherein the memory unit is comprised in said RF-ID tag.

15. The outdoor lighting apparatus for fixed installation according to claim 12, wherein the short range or very short range communication interface is adapted to allow an operator storing in the memory unit, during an installation step, a datum or a parameter identifying an installation position of the outdoor lighting apparatus.

16. The outdoor lighting apparatus for fixed installation according to claim 15, wherein said datum or parameter identifying the installation position of the outdoor lighting apparatus comprises coordinates in a satellite geo-localization system, an installation address, a number which allows identifying the relative installation position of the outdoor lighting apparatus in an array of lighting apparatuses, or combination thereof.

17. The outdoor lighting apparatus for fixed installation according to claim 12, wherein a datum identifying the outdoor lighting apparatus comprising a serial number, a network address, or both, is permanently stored in the memory unit.

18. The outdoor lighting apparatus for fixed installation according to claim 12, wherein a datum identifying a type of the outdoor lighting apparatus is permanently stored in the memory unit.

19. The outdoor lighting apparatus for fixed installation according to claim 12, wherein at least one of a configuration parameter and an operation parameter of the outdoor lighting apparatus is permanently stored in the memory unit.

20. The outdoor fighting apparatus for fixed installation according to claim 12, further comprising a sensor adapted to measure a magnitude related to an inclination of the outdoor lighting apparatus, said sensor being operatively connected to the processing and control unit and allowing the control and communication device to send to the remote control device a datum relative to the inclination, or an inclination change, of the outdoor lighting apparatus.

21. The outdoor lighting apparatus for fixed installation according to claim 12, wherein said outdoor lighting apparatus is a LED street lighting apparatus or a discharge lighting apparatus provided with a SAP or metal halide lamp.

22. An outdoor lighting system, comprising a plurality of lighting apparatuses, wherein each lighting apparatus of the plurality of lighting an apparatuses is an outdoor lighting apparatus for fixed installation adapted to be connected to a power grid to be supplied with a grid supply voltage, the outdoor lighting apparatus comprising:

at least one light source;

a driving circuit of the at least one light source;

a control and communication circuit, adapted to control the driving circuit, comprising a processing and control unit, a memory unit, and a long-range communication interface adapted to allow the control and communication circuit communicating with a remote control device; and wherein the control and communication circuit further comprises a short range or very short range communication interface adapted to interface with a communication and/or configuration mobile terminal of a field operator to allow said mobile terminal accessing the memory unit in writing, reading, or both, wherein said short range or very short range communication interface allows communication at a maximum communication distance of one meter or less.

* * * * *